United States Patent [19]

Beckstead et al.

[11] Patent Number: 4,551,314

[45] Date of Patent: Nov. 5, 1985

[54] PROCESS FOR IMPROVING SOLVENT EXTRACTION OPERATION USING TWO MIXERS

[75] Inventors: Leo W. Beckstead, Arvada; Linn D. Havelick, Westminster; Robert F. Hogsett, Arvada, all of Colo.

[73] Assignee: Amax Inc., Greenwich, Conn.

[21] Appl. No.: 599,127

[22] Filed: Apr. 11, 1984

[51] Int. Cl.$^4$ ............................................. C01G 41/00
[52] U.S. Cl. ................................. 423/54; 75/101 BE; 423/658.5
[58] Field of Search ............................. 423/54, 658.5; 75/101 BE

[56] References Cited

U.S. PATENT DOCUMENTS

| | | | |
|---|---|---|---|
| 4,328,190 | 5/1982 | Beckstead et al. | 423/54 |
| 4,369,165 | 1/1983 | Kim et al. | 423/54 |
| 4,374,099 | 2/1983 | Kim et al. | 423/54 |
| 4,450,144 | 5/1984 | Laferty et al. | 423/54 |

OTHER PUBLICATIONS

Ritcey et al., "Solvent Extraction, Part I", Elsevier, N.Y., 1984, pp. 207-229.
Ritcey et al., "Solvent Extraction, Part II", Elsevier, N.Y., 1979, pp. 627-642.
Lo et al., "Handbook of Solvent Extraction", John Wiley & Sons, N.Y., 1983, pp. 662-663.

Primary Examiner—H. T. Carter
Attorney, Agent, or Firm—Michael A. Ciomek; Eugene J. Kalil

[57] ABSTRACT

A solvent extraction process is provided for transferring metal values from one immiscible liquid phase to another, whereby the two liquid phases are vigorously mixed together in a first mixer under conditions in which one liquid phase is rendered continuous, the mixing being continued to effect complete transfer of metal values, and the mixture then passed to a second mixer and the two phases mixed under conditions in which the other phase is rendered continuous, whereby when the two phases are fed to a settler, the rate of disengagement of the two immiscible liquids is substantially increased.

11 Claims, 1 Drawing Figure

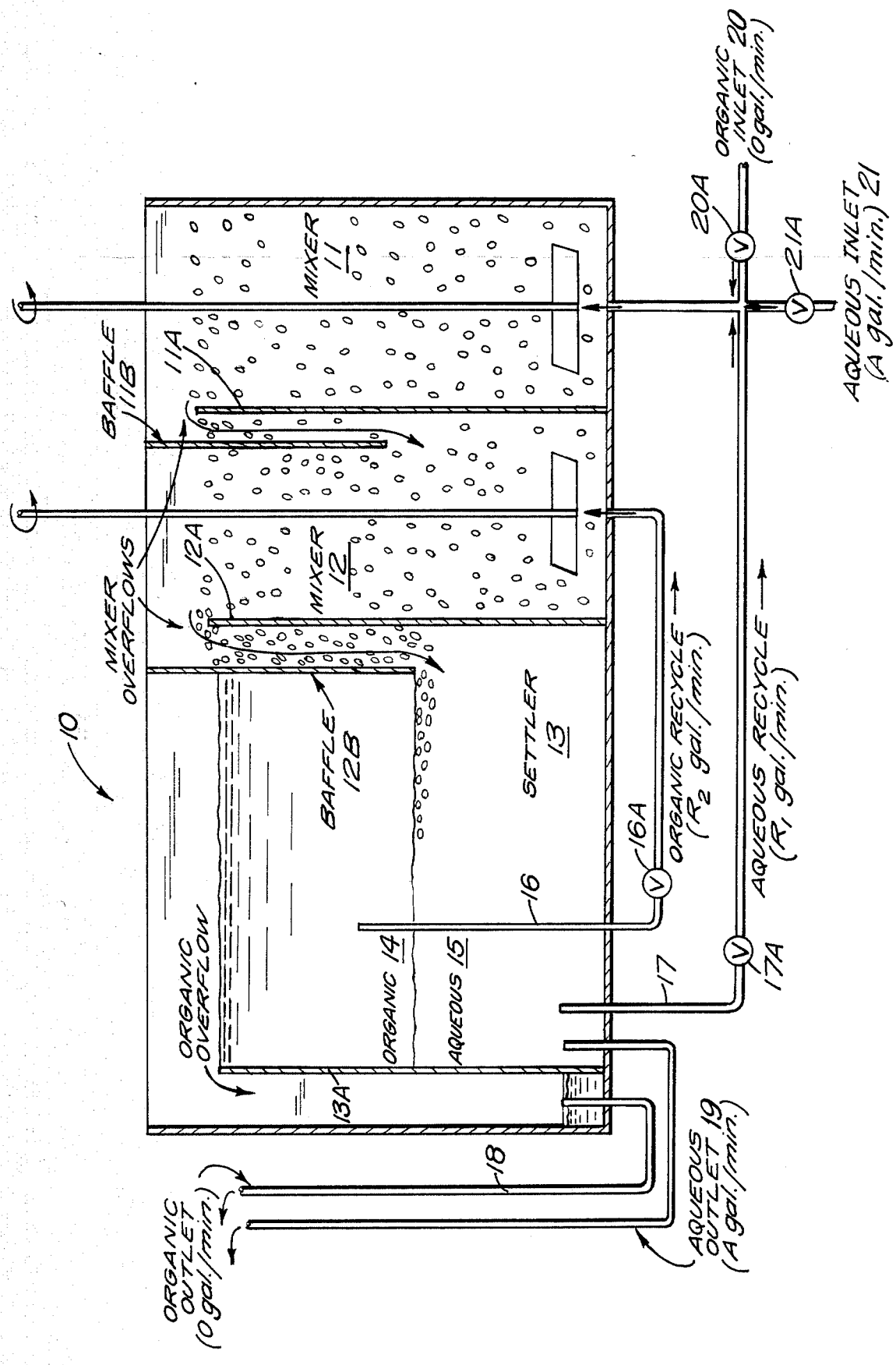

PROCESS FOR IMPROVING SOLVENT EXTRACTION OPERATION USING TWO MIXERS

This invention relates to a liquid/liquid solvent extraction system and, in particular, to a method for improving a solvent extraction operation by using two mixers in series for controlling the type of continuous liquid phase desired during mixing.

BACKGROUND OF THE INVENTION

It is known to extract tungsten values from an aqueous phase by using a solvent extraction process in which the liquid phases involved are substantially immiscible. Solvent extraction is used to separate tungsten values from contaminants which accompany tungsten in solution in the aqueous phase during leaching of tungsten oxide concentrates. These contaminants include the sodium ion and the sulfate ion, and also include silica, fluorine, calcium and magnesium.

The tungsten-bearing aqueous phase is intimately mixed with an organic phase typically comprising at least one extractant for the tungsten values and one or more other liquid organic compounds. The tungsten values are extracted into the organic phase, and the mixture of organic and aqueous phases is allowed to settle so that the two phases can be recovered separately. The steps of mixing and settling can be repeated several times to improve the overall degree of extraction of tungsten values.

A problem encountered in solvent extraction of tungsten values is the formation of a third phase. The third phase can comprise liquid, solids, or a mixture of liquid and solid. The third phase is formed when the tungsten content extracted into the organic phase exceeds a moderate level. The third phase builds up, so that process equipment must periodically be shut down to remove it, and it represents lost extraction efficiency. This problem can be caused by the excessive transfer of impurities from the aqueous phase into the organic phase, or by the choice of constituents used in the organic phase. This drawback can require the operator to tolerate low tungsten contents in the organic phase so as to avoid formation of the third phase.

A related problem is the slow rate at which the aqueous and organic phases separate in the settling stage. Stated another way, the mixture of aqueous and organic phases fed to a settler should separate quickly into two discrete phases, but in actual practice relatively long periods of time may be necessary to separate the two phases to a satisfactory degree.

Phase disengagement rate is a critical property in solvent extraction. In the publication Separation Science And Technology, 16(9), pp. 1261-1289 [1981], phase disengagement is discussed in some detail. According to the article, the type of extractant used appears to have an effect on phase disengagement. Batch phase disengagement tests have shown significant trends with respect to the structure of the amine used as the extractant. In general, organic continuous phase disengagement became slower with increasing number of carbon atoms per chain, whether branched or linear chain. However, for any given number of carbons, the branched chain amines had a much faster organic continuous disengagement than the linear chains.

The choice of phase continuity is important in certain solvent extraction operations. For example, in stripping tungsten from a loaded organic using ammonium hydroxide as the stripping solution, an aqueous continuous mixture of aqueous and organic solutions is preferred. During stripping it is important that precipitation of ammonium paratungstate (APT) be prevented. This is accomplished by injecting the tungsten-loaded organic into a high-shear region near the impeller of the strip mixer. The mixer is operated with the aqueous phase continuous in order to facilitate the rapid pH change required to prevent APT from precipitating. However, by operating the mixer aqueous-continuous, the entrainment of organic in the aqueous solution can be substantial, the solution thereafter going to the APT crystallizer. A gradual build-up of organics (total organic carbon, TOC) through recycling of the crystallizer mother liquor results in foaming in the crystallizer which is not desirable. Moreover the disengagement of the phases is not all that is desired.

Recently, it has been determined that agitation and rapid mixing of the organic and aqueous phases is more important than phase continuity. However, the type of phase continuity itself can be important to assure efficient disengagement of the phases in the settler.

It would be desirable to provide a solvent extraction process in which entrainment of the organic in the aqueous phase is substantially reduced and the rate of disengagement between the two phases markedly increased.

OBJECTS OF THE INVENTION

It is an object of the invention to provide a solvent extraction system characterized by minimum phase entrainment of one phase in the other during mixing and characterized by substantially improved rate of disengagement of one from the other following mixing.

Another object is to provide the foregoing solvent extraction system as applied to the solvent extraction of tungsten from aqueous solutions.

These and other objects will more clearly appear when taken in conjunction with the following disclosure, the appended claims and the accompanying drawing.

SUMMARY OF THE INVENTION

The invention is applicable to a solvent extraction system comprising two immiscible liquid phases X and Y, wherein one of the phases contains metal values which is extractable by the other when the two phases are vigorously mixed together under conditions in which the mixing is X continuous, during which the X phase entrains substantial amounts of the Y phase which adversely affects the subsequent processing of the X phase and the disengagement rate between phases.

In achieving the results of the invention, the two phases are first mixed in a mixer under conditions to provide a mix which is X continuous, following which the X continuous mixture is then passed to a second mixer and the two phases further mixed under conditions to provide a mix which is Y continuous. The series mixing results in substantially less entrainment of the Y phase into the X phase. In addition, the rate of disengagement of the two phases during settling is markedly increased.

The foregoing method is particularly applicable to the hydrometallurgy of tungsten in which solvent extraction and stripping are employed in the final recovery of tungsten in the substantially pure state.

As illustrative of the use of solvent extraction in the hydrometallurgy of tungsten, attention is directed to U.S. Pat. No. 4,328,190, the disclosure of which is incorporated herein by reference.

DETAILS OF THE INVENTION

In the hydrometallurgy of tungsten, a known method is to leach tungsten oxide concentrates with sodium carbonate solutions, the tungsten oxide ($WO_3$) concentrates containing up to about 70% by weight of $WO_3$, e.g., about 2% to 70% or 5% to 70% $WO_3$. Low grade scheelite concentrates containing about 2% to 40% $WO_3$ may be similarly leached.

A process illustrating the aforementioned type of leaching is disclosed in U.S. Pat. No. 4,351,808, the disclosure of which is incorporated herein by reference. According to this patent, scheelite concentrate is leached by forming it into a slurry in an aqueous sodium carbonate solution of initial concentration ranging from about 50 gpl to 200 gpl (grams per liter) at a $Na_2CO_3$/$WO_3$ weight ratio of about 0.9 to 1.6 and then digesting the slurry in an autoclave at an elevated temperature ranging from about 180° C. to 310° C., e.g., about 200° C. to 250° C., preferably from about 200° C. to 235° C.

Optimum results are achieved by employing the $Na_2CO_3$ concentration of the leach solution in substantially inverse relationship with the digestion temperature and in substantially direct relationship with the $Na_2CO_3$/$WO_3$ weight ratio, the relationship selected being such as to effect the consistent dissolution of at least about 95% of the $WO_3$ in the concentrate, preferably at least about 97%, and provide a pregnant liquor containing the $WO_3$. By employing the foregoing relationship, the alkalinity can be controlled to levels favorable to the substantial inhibition of gangue minerals, such as gangue containing one or more of CaO, $SiO_2$, calcium fluoride, etc. The presence of magnesium in the form of a magnesium-containing compound is very helpful in inhibiting substantially the dissolution of silica. The magnesium compound may be naturally present or deliberately added as dolomite. The amount of magnesium present may range from about 2% to 10% by weight of the concentrate, and preferably from about 4% to 6% by weight.

In a preferred embodiment, the soda ash concentration ranges from about 75 gpl to 175 gpl and more preferably from about 75 gpl to 150 gpl. Likewise, the $Na_2CO_3$/$WO_3$ weight ratio may range from about 1 to 1.4.

The concentration of the ingredients will depend on the conditions prevailing in the autoclave. For example, where steam is employed for heating, steam condensation during digestion can dilute the solution and lower the concentration. On the other hand, where indirect heating is employed, there will be no dilution. Following digestion, if the pressure is let down through heat exchangers, there will be no concentration of the liquor. But if the pressure is let down by steam flashing, the solution will concentrate as much as 20% to 30%.

The higher the digestion temperatures, the less is the amount of soda ash needed to achieve high tungsten extraction and the greater is the $WO_3$/$Na_2CO_3$ ratio in the pregnant solution. Also the higher the initial concentration of $Na_2CO_3$, the higher the weight ratio of $Na_2CO_3$/$WO_3$ needed to obtain $WO_3$ extraction in excess of 95%, e.g., at least about 97% or 98%. By controlling the $Na_2CO_3$/$WO_3$ weight ratio, pregnant liquors containing up to about 130 or 140 gpl of $WO_3$ are obtainable.

Depending upon the grade of tungsten oxide concentrate leached, the resulting aqueous phase may contain as low as 10 grams per liter (gpl) $WO_3$ and range up to as high as that stated hereinabove, i.e., to about 130 or 140 gpl $WO_3$. The aqueous tungstate solution advantageously contains at least about 50 gpl $WO_3$, and more advantageously at least about 60 gpl $WO_3$, e.g., about 60 gpl to 100 gpl $WO_3$. The amount of tungsten subsequently extracted into the organic phase and thus available for further processing generally increases with increasing tungsten concentration in the aqueous phase. The process can advantageously be applied to form relatively high tungsten contents in the organic phase. The aqueous phase may be typically contaminated with about 35 to about 55 gpl of sodium ion, about 50 to about 80 gpl of sulfate ion, and up to about 500 ppm of other impurities such as silica, fluorine, calcium and magnesium.

The pH is adjusted prior to solvent extraction by the organic phase as disclosed in U.S. Pat. No. 4,328,190. The tungsten values are effectively extracted from the aqueous phase by employing as the organic phase a selected mixture of hydrocarbon liquids described as follows. The organic phase contains secondary or tertiary amine in an amount effective to extract tungsten values from the aqueous phase into the organic phase. Advantageously, the secondary or tertiary amine comprises about 2 vol. % to about 20 vol. %, and more advantageously about 5 vol. % to about 15 vol. %, of the organic phase. For secondary amines, the two substituents are generally two of the following in any combination: aryl, alkyl or alkenyl. In addition, the total number of carbon atoms should be at least six or a sufficient number to impart low water solubility and high organic solubility so as to give a high distribution coefficient in the two phase organic solvent and water system employed and leave less than about 1.5 grams of amine dissolved in each liter of aqueous phase. For tertiary amines, the three substituents should preferably be three of the following in any combination: aryl, alkyl or alkenyl. In addition the total number of carbon atoms should be at least six or a sufficient number to impart low water solubility and higher organic solubility so as to give a high distribution coefficient in the two phase organic solvent and water system employed and leave less than about 0.5 gram of amine dissolved in each liter of aqueous phase. Exemplary amines include bis-(isobutyl-3,5-dimethyl hexyl) amine, tertiary-octyl amine, tri-isooctyl amine, triamyl amine, ditridecyl amine, tristridecyl amine, among others. A satisfactory amine is ditridecylamine, such as a product sold by Sherex Chemical Co. under the name "Adogen 283", which contains at least about 80 vol. % ditridecylamine, about 15 vol. % tertiary amines, and 2 to 3 vol. % primary amines.

The organic phase generally contains a modifier, such as a long-chain alcohol having 6 to 15 carbon atoms. Advantageously modifiers are nonanol and isodecanol. The modifier is added to the organic phase to promote rapid and clear separation of the aqueous and organic phases following mixing thereof. The modifier also increases the solubility of the tungsten-organic complex (formed when tungsten transfers from the aqueous phase to the organic phase) in the organic phase.

The balance of the organic phase comprises a solvent, e.g., one or more liquid hydrocarbons, in which the organic extractant and modifier are completely soluble and from which the aqueous phase can be rapidly separated. Aromatic-type solvents should be employed when the extractant comprises a tertiary amine, while aromatic or aliphatic solvents can be employed when the extractant comprises a secondary amine. Advantageously, the components of the organic phase are completely soluble in the solvent even when the amine extractant is fully loaded with tungsten. A highly advantageous solvent comprises a mixture of liquid hydrocarbons, characterized in that it has a boiling point range of about 190° C. to about 220° C., and in that at least about 98 wt. % of it comprises a mixture of linear, saturated paraffins 10 to 13 carbon atoms in length. A highly satisfactory solvent is "ESCAID 200"; this product typically contains about 12.7 wt. % $C_{10}H_{22}$, about 35.3 wt. % $C_{11}H_{24}$, about 43.2 wt. % $C_{12}H_{26}$, about 6.9 wt. % $C_{13}H_{28}$, about 0.2 wt. % isoparaffins, about 1.1 wt. % cycloparaffins, and about 0.6 wt. % monoaromatics. By aromatic solvents are meant solvents comprising about 10 vol. % or more of aromatic components.

Tungsten values are extracted from the aqueous phase into the organic phase, the phases having the characteristics described above, by contacting the two phases in a plurality of extraction stages operating in countercurrent fashion. From 2 to 10 extraction stages can be employed, although advantageously 2 to 6 stages and more advantageously 4 stages provide a satisfactorily high degree of tungsten extraction together with a satisfactorily low extraction of impurities.

Each extraction stage may comprise a mixing section and a settling section. The aqueous phase and the organic phase are fed from other extraction stages into the mixing section, where they are intimately mixed together under agitation sufficient to provide mass transfer of tungsten values from the aqueous phase into the organic phase, but not so severe that the two phases form a stable emulsion or a third phase. The mixture formed in the mixing section typically flows out of that section near the top thereof and is conveyed past suitable baffling to an associated settling section in which the organic and aqueous phases are permitted to separate into two discrete layers.

The organic phase enriched in tungsten which is recovered from the extraction stages can contain at least about 30 gpl up to about 120 gpl $WO_3$, or more, and advantageously at least about 40 gpl and more advantageously at least about 60 gpl $WO_3$, depending on the tungsten content of the aqueous phase to be extracted. A tungsten content in the organic phase as high as about 120 gpl $WO_3$ or more can be achieved. Extractions of about 99% or more, and advantageously at least about 99.9%, permit increased rates of tungsten recovery with efficient use of reagents.

When the aqueous phase fed to the extraction stages is contaminated with sodium ions, sulfate ions and other impurities, the organic phase enriched in tungsten contains minor amounts of the contaminants. For instance, washing and stripping the loaded organic can provide an aqueous strip liquor containing about 150 to about 250 gpl $WO_3$ or more, with less than about 20 ppm and more advantageously less than about 10 ppm of sodium ion, and containing less than about 10 gpl and more advantageously less than about 2 gpl of sulfate ion.

In stripping the tungsten values from the organic solvent, a stripping solution of ammonium hydroxide having a pH of about 10.5 and a total ammonia content corresponding to about 50 to 85 gpl $NH_3$ may be employed for stripping a loaded organic containing about 45 to 65 gpl $WO_3$.

In carrying the invention into practice, the initial phase continuity in solvent extraction, e.g. stripping, can be determined according to the prevailing phase the agitation is started in. Thus, if the agitation is begun in the aqueous phase, the system will usually remain aqueous continuous. If the agitation is started in the organic phase, the system will be organic continuous.

One method of achieving the desired phase continuity is to move the impeller to that part of the mixer in which the particular phase exists. For example, if initially the phases are separated in the mixer with the aqueous phase at the bottom and the organic phase at the top, then the mixing would be started with the impeller located in the aqueous phase.

Once the mixture becomes aqueous continuous, the impeller is repositioned to its normal position and stirring continued as the two phases are fed to the mixer in the desired phase ratio. The aqueous continuous mixture is then caused to flow in the second mixer. The second mixer during start-up may contain the organic phase. As the aqueous continuous mixture flows into the second mixer containing the organic phase as a starter, the ultimate mixture under steady state conditions will be organic continuous while the two phases enter and leave the system at the desired phase ratio. The impeller in the second mixer may have to be repositioned after organic continuous obtains.

Generally speaking, a more practical method of obtaining the desired phase continuity is to flood a particular mixer with the desired phase before the two phases are added. Once the desired phase continuity is established, flow rates (including recycle flows) can then be adjusted. This technique is preferred and more easily implemented than to position and reposition the impeller.

One embodiment for carrying out the invention is illustrated in the accompanying drawing consisting essentially of a mixer-settler system designated generally by the numeral 10, the system comprising first and second mixers, 11, 12 in series, with mixer 12 communicating with settler 13 as shown.

The mixers are separated by a partition 11A of a height sufficient to allow for overflow of the mixture from mixer 11 to mixer 12, a baffle 11B being provided forward of partition 11A. The overflow mixture flows down between baffle 11B and partition 11A into mixer 12.

Mixer 12 also has a partition 12A of height sufficient to provide overflow into settler 13, a baffle 12B being similarly provided as shown.

The settler is provided with an overflow partition 13A. The two phases separate to provide upper organic body or layer 14 and lower aqueous body or layer 15. In this embodiment, recycle flows are provided from organic body 14 and aqueous body 15 for recycling the organic to mixer 12 and the aqueous to mixer 11, via lines 16 and 17, respectively. Only a portion of each of the phases is recycled, the balance going to outlet 18 for the organic phase (O) at a rate of O gal./min. and outlet 19 for the aqueous phase (A) at A gal./min.

The organic recycle which represents only a portion of the organic product is recycled at a rate of $R_2$ gal./min., with the aqueous phase recycled at a rate of $R_1$ gal./min.

The aqueous recycle line 17 merges with the organic feed inlet 20 through valve 20A and aqueous feed inlet 21 through valve 21A, with the liquids flowing into mixer 11. As will be noted, the organic (O) feed 20 flows at a rate of O gal./min. and the aqueous (A) phase at A gal./min. the same as the flow through exit lines 18 and 19, respectively. Mixer 11 can be started as aqueous continuous by first feeding recycle aqueous to the mixer.

The steady state conditions as to the flows of liquids into and out of the system and the recycle of each within the system are easily determined by tests as will be apparent to those skilled in the art.

For example, the organic (O) flow rate of O gal./min. and the aqueous (A) flow rate of A gal./min. will provide a net organic to aqueous ratio of O/A. In the stripping operation, it is usually desired to concentrate the aqueous strip solution, so that the ratio of O to A in this stage may be of the order of about 5 to 1 or even 10 to 1. However, it is almost impossible in conventional practice to maintain aqueous phase continuity at an O/A ratio greater than about 3/1, and, in practice, aqueous continuity can be maintained more easily if the volume of aqueous phase in the mixer is equal to or greater than the volume of organic phase. The reverse also holds true for organic continuous systems.

In order to obtain and maintain aqueous continuity in mixer 11, an aqueous recycle line can be opened via valve 17A and aqueous solution pumped into mixer 11, thus flooding the mixer with the aqueous phase and allowing aqueous continuous conditions to be obtained as the two phases enter and are mixed in mixer 11.

Once the system is operating with the aqueous phase continuous, the rate of recycle can be adjusted via valve 17A to obtain an aqueous organic phase ratio of about 1.2/1 in mixer 11, although the net aqueous to organic ratio across the system is still determined by the aqueous inlet flow (A gal./min.) divided by the organic inlet flow rate (O gal./min.), i.e. A/O.

Under the conditions described above, mixer 12 will eventually operate aqueous continuous. To change the phase continuity, an organic recycle line can be opened via valve 16A and the organic phase pumped to mixer 12 until organic continuous obtains. Once the proper continuity is achieved, the recycle rate can be adjusted via valve 16A to obtain an aqueous to organic phase ratio of about 1 to 1.2 in mixer 12.

As will be clearly apparent, by the proper use of recycle streams, the phase continuity in either mixer can be controlled without changing the overall phase inlet and outlet ratios for a particular mixer-settler arrangement.

While the embodiment shown in the drawing describes a system comprising two mixers and one settler in a stripping circuit, the principle can be applied to all stages of solvent extraction, for example, the situation where metal values are extracted from an aqueous leach solution using an organic solvent.

As illustrative of one embodiment for carrying out the invention in which a loaded organic is stripped of tungsten values, the following example is given.

EXAMPLE

A loaded organic containing 55 gpl WO$_3$ is stripped with an aqueous ammonium hydroxide solution of concentration corresponding to 5 molar free NH$_3$, the volume ratio of aqueous to organic being 1.2 to 1. The two liquid phases are fed at the ratio stated into a first mixer, the conditions being such as described hereinabove that the aqueous solution is the continuous phase. This can be achieved by starting the mixing with substantially the aqueous phase and then adding the two phases at the specified volume ratio. The first addition of the aqueous phase determines the aqueous continuous phase of the subsequent mixture at the volume ratio stated hereinabove. During vigorous mixing, the tungsten values enter the continuous aqueous phase.

The mixture is then passed to a second mixer under conditions that produce an organic continuous phase. This can be achieved by starting the mixing using the organic phase alone and then feeding the two mixed phases at the specified volume ratio to the mixer, thereby providing a final mixture which is organic continuous and the mixing continued for a time sufficient to complete the stripping and provide a final mix which separates easily in the settler.

Following operation of the first mixer with aqueous continuous and the second mixer with organic continuous in the test conducted on aforementioned solution, the following results were obtained upon completion of settling.

| Stripping Operation | Phase Disengagement Rate,* gpm/ft$^2$ | Strip Solution TOC,** ppm |
|---|---|---|
| First and second mixers both aqueous continuous | 3.12 | 112 |
| (Invention) First mixer aqueous continuous; second mixer organic continuous | 5.45 | 77 |

*Gallons/minute/ft.$^2$
**Total organic carbon

As will be noted, phase disengagement increased by over 70%. The strip solution obtained with the invention also showed a marked decrease of total organic carbon of approximately 30%, thus showing that less organic is entrained by first mixing the phases aqueous continuous and then mixing the phases thereafter organic continuous.

As stated hereinbefore, in producing the desired continuous phases of either aqueous or organic, one starts the mixing with substantially that particular phase prior to adding the two phases. In the case of X and Y phases, to produce X phase continuous the X phase is first fed to the mixer under conditions in which the amount of X phase added predominates and is substantially in excess of the volume ratio R of X to Y and ranging up to infinity (i.e., all X phase), for example, up to a ratio of X to Y of 1,000 to 1. Alternatively, the positioning of the impeller can be used to assist in attaining the desired phase continuity. Whether the impeller is moved or not, the mixing should be started substantially with that phase which is to be continuous. If the desired effect is achieved by relocating the impeller, it is to be understood that the claims are meant to cover that embodiment.

Likewise, in producing the Y phase continuous in the second mixer, the X and Y mixture at the volume ratio R is fed from the first mixer to the second mixer under conditions in which the Y phase is the continuous phase. This is achieved again by first feeding the Y phase to the second mixer in which the amount added predominates and is substantially in excess of the ratio of Y to X, i.e., in excess of 1/R, and ranging up to infinity (i.e., all Y phase), for example, up to a ratio of Y to X of 1,000:1.

During extraction or stripping of the metal values, the ratio of X phase to Y phase, e.g., aqueous to organic, may range from about 0.25:1 to 5:1 and, preferably, from about 0.75:1 to 2:1.

Thus, where the volume ratio R of aqueous to organic ranges from 0.25:1 to say 3:1, the organic to aqueous ratio will correspond to 1/R or 4 to 1 to 1 to 3.

As stated hereinbefore, in maintaining the desired continuity, one phase may be recycled from the settler back to the mixer for easier control without disturbing the overall phase ratio of the system. Thus, it is possible to have organic continuity with 1 volume of organic and 3 volumes of aqueous. However, in practice, it is easier to maintain organic continuity if the organic phase is slightly in excess of the aqueous phase. Thus, the organic can be recycled from a settler back to a mixer without changing the 1 to 3 "net" ratio but will change the mixing ratio and allow easier maintenance of phase continuity. The same holds true for maintaining aqueous continuous. The "net" effect ratio is determined by the actual volumes of aqueous and organic phases entering and leaving a mixer-settler arrangement not counting any internal recycle in a single stage.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a solvent extraction stripping system comprising an aqueous stripping phase of an ammonium hydroxide solution and an immiscible organic phase containing tungsten values by virtue of an amine extractant contained in said immiscible organic, wherein said two phases are fed to and through the system at a net volume ratio R of aqueous to organic and mixed together to effect extraction of said tungsten values by said aqueous phase with the aqueous phase continuous, and wherein said aqueous phase is characterized by entraining substantial amounts of said tungsten-containing organic phase during mixing which adversely affects the subsequent processing of the aqueous phase and adversely affects the subsequent disengagement rate between said phase during separation by settling, the improvement which comprises, (a) establishing a bath of said aqueous and organic phases in a first mixer, (b) starting the mixing thereof with the aqueous phase predominant during the initial stages of mixing and thereby produce a mixture with the aqueous phase continuous, (c) passing said mixed phases to a second mixer and starting the mixing thereof with the organic phase predominant during the initial stage of mixing and thereby produce a mixture with the organic phase continuous, (d) maintaining the net flow of the phases through the system at said net volume ratio R of aqueous to organic, (e) passing said mixed phases from said second mixer to a settler,
whereby the rate of disengagement of the phases is substantially increased and the aqueous phase substantially impoverished in entrained organic phase, and (f) continuing feeding said phases through the system at said net volume ratio R of aqueous to organic.

2. The solvent extraction stripping system of claim 1, wherein the net volume ratio R of the aqueous to organic phases through the system ranges from about 0.25:1 to 5:1.

3. The solvent extraction stripping system of claim 2, wherein the net volume ratio R of aqueous to organic through the system ranges from about 0.75 to 1 to 2 to 1.

4. The solvent extraction stripping system of claim 1,
wherein said continuous aqueous phase in the first mixer is maintained by recycling a portion of said aqueous phase following settling to the first mixer, and
wherein said continuous organic phase in the second mixer is maintained by recycling a portion of said organic phase following settling back to the second mixer.

5. The solvent extraction stripping system of claim 1,
wherein the bath in the first mixer is established with the two immiscible phases separated into two layers, and
wherein the mixing to produce the aqueous continuous phase is started by using a bladed stirrer with the blade positioned in the aqueous layer of the bath.

6. The solvent extraction stripping system of claim 1, wherein the aqueous continuous phase is produced in the first mixer by starting with the aqueous phase predominant during the initial stages of the mixing at a volume ratio of aqueous to organic in excess of 1:1 and ranging up to infinity.

7. In a solvent extraction stripping system comprising an aqueous stripping phase of an ammonium hydroxide solution and an immiscible organic phase containing about 30 gpl to 120 gpl tungsten values by virtue of an amine extractant contained in said organic, wherein said two phases are fed to and through the system at a selected net volume ratio R of aqueous to organic ranging from about 0.25:1 to 5:1 and mixed together to effect extraction of said tungsten values by said aqueous phase with the aqueous phase continuous, and wherein said aqueous phase is characterized by entraining substantial amounts of said tungsten-containing organic phase during mixing which adversely affects the subsequent processing of the aqueous phase and adversely affects the subsequent disengagement rate between said phase during separation by settling, the improvement which comprises, (a) establishing a bath of said aqueous and organic phases in a first mixer, (b) starting the mixing thereof with the aqueous phase predominant during the initial stages of mixing and thereby produce a mixture with the aqueous phase continuous, (c) passing said mixed phases to a second mixer and starting the mixing thereof with the organic phase predominant during the initial stage of mixing and thereby produce a mixture with the organic phase continuous, (d) maintaining the net flow of the phases through the system at said net volume ratio R of aqueous to organic, (e) passing said mixed phases from said second mixer to a settler,
whereby the rate of disengagement of the phases is substantially increased and the aqueous phase substantially impoverished in entrained organic phase, and (f) continuing feeding said phases through the system at said net volume ratio R of aqueous to organic.

8. The solvent extraction stripping system of claim 7, wherein the net volume ratio R ranges from about 0.75 to 1 to 2 to 1.

9. The solvent extraction stripping system of claim 7,
wherein said continuous aqueous phase in the first mixer is maintained by recycling a portion of said aqueous phase following settling back to the first mixer, and wherein said continuous organic phase in the second mixer is maintained by recycling a portion of said organic phase following settling back to the second mixer.

10. The solvent extraction stripping system of claim 7, wherein the bath in the first mixer is established with the two immiscible phases separated into two layers, and wherein the mixing to produce the aqueous continuous phase is started by using a bladed stirrer with the blade positioned in the aqueous layer of the bath.

11. The solvent extraction stripping system of claim 7, wherein the aqueous continuous phase is produced in the first mixer by starting with the aqueous phase predominant during the initial stages of mixing at a volume ratio of aqueous to organic in excess of 1:1 and ranging up to infinity.

* * * * *